United States Patent
Bergey

[11] 3,841,083
[45] Oct. 15, 1974

[54] SELF-ILLUMINATED LIQUID CRYSTAL TIMEPIECE

[75] Inventor: John M. Bergey, Lancaster, Pa.

[73] Assignee: Time Computer, Inc., Lancaster, Pa.

[22] Filed: Jan. 5, 1973

[21] Appl. No.: 321,468

Related U.S. Application Data

[63] Continuation-in-part of Ser. No. 119,806, March 1, 1971, Pat. No. 3,722,206, which is a continuation of Ser. No. 794,551, Jan. 28, 1969, abandoned.

[52] U.S. Cl. ..................... 58/50 R, 350/160 LC
[51] Int. Cl. ............................................. G04b 19/30
[58] Field of Search ............. 58/23 R, 50 R, 127 R; 350/150, 160 CL; 340/336

[56] References Cited
UNITED STATES PATENTS

| | | | |
|---|---|---|---|
| 3,015,094 | 12/1961 | Reynolds, Jr. | 58/50 R |
| 3,078,364 | 2/1963 | Neugebauer | 58/50 R |
| 3,224,184 | 12/1965 | Brien | 58/50 R |
| 3,273,139 | 9/1966 | Flactiff et al. | 58/50 R |
| 3,321,905 | 5/1967 | Krebs | 58/50 R |
| 3,322,485 | 5/1967 | Williams | 350/160 |
| 3,485,033 | 12/1969 | Langley | 58/35 R X |
| 3,505,804 | 4/1970 | Hofstein | 58/50 R |
| 3,700,306 | 10/1972 | Cartmell et al. | 350/160 LC |

*Primary Examiner*—Richard B. Wilkinson
*Assistant Examiner*—Edith Simmons Jackmon
*Attorney, Agent, or Firm*—Le Blanc & Shur

[57] ABSTRACT

The time piece includes seven-bar-segment digital time indicating displays, the segments being selectively actuated by a time indicating source through a logic circuit. In one form, the display face includes a clear front glass, a dark back reflector glass spaced from the front glass, liquid crystals disposed between the glasses and an electrode material formed on the back glass with portions thereof removed while the remaining portions form electrodes for the seven bar segments. Selected energization of the electrodes energizes the liquid crystal segments to provide a light scattering effect whereby light incident to the energized liquid crystal segments is reflected to provide a digital display against a dark background. A nuclear powered light source surrounds the display face to provide light incident to the energized liquid crystals for digital display under dark conditions. In another form, the front glass is coated white except for the segments and a nuclear powered light source is located behind the rear clear glass plate on which the electrodes are carried. In the daytime, the energized bar segments reflect light rendering the same indistinguishable from the white opaque surface whereby the natural color of the nuclear light source appears through the nonenergized and transparent liquid crystal bar segments providing a daytime digital time display. For nighttime display, the nuclear powered light source transmits light through the nonenergized liquid crystal bar segments to provide the digital time display.

9 Claims, 9 Drawing Figures

PATENTED OCT 15 1974 3,841,083

SELF-ILLUMINATED LIQUID CRYSTAL TIMEPIECE

This application is a continuation-in-part of copending application Ser. No. 119,806 filed Mar. 1, 1971, which is Pat. No. 3,722,204 and is in turn a continuation of application Ser. No. 794,551 filed Jan. 28, 1969 which is now abandoned.

The present invention relates to timepieces and more particularly relates to timepieces such as watches, clocks and the like having digital time displays which are readily readable under variable lighting conditions.

Various methods have heretofore been employed to render watch or clock dials readable under variable lighting conditions, i.e., day, night or semidark lighting conditions. For example, it is common knowledge to provide watch or clock dials formed either with luminous numerals against a nonluminous background or a luminous background and nonluminous numerals to provide readability under low light conditions. Additionally, watch and clock dial faces have been provided with auxiliary light sources to light the dial under dark conditions. It has also previously been known to provide clocks utilizing florescent materials which can be irradiated by ultraviolet rays for reading in the dark.

While timepieces having fixed dials and numeral displays and provided with various devices to provide readability during various lighting conditions are abundant throughout the prior art, the advent of digital displays for watches, clocks and the like has raised significantly different problems in providing digital readability under all lighting conditions than those problems heretofore encountered with the display of fixed numerals on prior watch or clock dials. Moreover, the problem of providing digital readability for watch displays is compounded by the necessary compactness of watches which affords little space and inadequate power for elaborate and known lighting techniques.

In accordance with the present invention, there is provided a digital time display in a watch, clock or the like which is readable under all lighting conditions. To accomplish this, the present digital time display makes use of the electromagnetic-optical properties of liquid crystals in combination with a self-contained nuclear powered light source. One type of liquid crystal is a substance whose rheological behavior is similar to the crystalline state over a given temperature range, an example of which is the nematic substance p-azoxyanisole. One of the characteristics of liquid crystals in this nematic class is their optical effect in two different states. In a quiescent state with no energy field applied, the liquid crystal is essentially transparent. However, when an energy field is applied, either electric or magnetic, the liquid crystal exhibits light scattering characteristics. A second type of nematic liquid crystal is the so-called field effect liquid crystal in which the molecules are twisted or not aligned with no field applied but which align themselves with the field when an electrical field is applied to the material.

To employ this phenomenon in a digital time display readable under variable lighting conditions, there is provided in accordance with the present invention, a display face in a watch, clock or similar timepiece having a clear front glass plate and a dark back reflector glass plate spaced one from the other with the liquid crystal sandwiched therebetween. In one form, clear metal electrodes are provided on the back plate and disposed to provide a plurality of seven-bar-segment digital displays. In a watch, four seven-bar-segments are arranged in side-by-isde relation to display the hours and minutes in digital form (the tens of hours digit may be a four-bar-segment) although it will be appreciated that six seven-bar-segments could be utilized wherein hour, minutes and seconds would be displayed in digital form. A nuclear powered light source, preferably a Beltalight (a trademark of Saunders-Roe Developments Limited) source, is disposed about the face of the display slightly outwardly thereof as to provide light incident to the display. Under day lighting conditions, selected energization of the electrodes applies an energy field through the liquid crystals disposed between the selected electrodes wherein the energized liquid crystal bar segments display a light scattering optical effect. In other words, when the bar-segment is energized, ambient light incident on the face of the display is reflected by the energized liquid crystal bar-segments as to be readable under day lighting conditions against the dark background. Thus, by selectively energizing the bar-segments of each of the digital displays, a clearly readable and distinguishable time display is provided under day lighting conditions. Under substantial dark conditions, the liquid crystals of the various bar-segments are selectively energized as before and the nuclear powered light source about the display face provides the necessary incident light which is reflected from the energized liquid crystal bar-segments. The reflected light of the nuclear powered light source from the energized liquid crystal bar-segments is sufficiently bright under dark conditions as to provide a readable and clearly distinguishable digital time display.

In another form hereof, the display face is coated with a white opaque material (with the exception of the face portions overlying the seven-bar-segments formed by the electrode coated clear rear glass plate) and a nuclear powered light source, preferably a Betalight emitting plate, is disposed behind the clear rear glass plate. The white coated front glass plate thus outlines the seven-bar-segments of the digital display. When the liquid crystals of the selected segments are energized, ambient light under day lighting conditions is reflected and this reflected light of the energized segments and the white coated display face blend in color as to be indistinguishable one from the other. The digital time display is thus provided by the nonenergized liquid crystals which, as noted previously, are transparent in this state. Accordingly, the natural dark color of the nuclear light source behind the display is exhibited through the non-energized liquid crystal segment. Under dark conditions, the energized liquid crystal segments reflect the light from the source back towards the source and prevent transmission of such light through the front glass of the display. The nonenergized segments, however, are transparent and permit the light from the nuclear source to be transmitted through the associated nonenergized liquid crystals whereby the numeral display is readily readable with clear digital definition.

Accordingly, it is the primary object of the present invention to provide a digital time display readable under variable lighting conditions.

It is another object of the present invention to utilize the optical properties of liquid crystals in conjunction with a nuclear powered light source to provide a digital time display under variable lighting conditions.

It is still another object of the present invention to provide a digital time display in a watch wherein the display increases in visibility and contrast as the surrounding light increases and wherein such digital time display can be employed under dark conditions.

It is a further object of the present invention to provide in a digital time display the combined read-out effects of electronically stimulated liquid crystals with a self-powered nuclear light source such that the time display can be readily viewed under light, dark or semidark conditions.

It is a still further object of the present invention to provide a digital time display readable under light, dark, and semidark conditions having extremely small power requirements and manufactured from low cost materials.

These and further objects and advantages of the present invention will become more apparent upon reference to the following specification, amended claims and drawings wherein:

Figure 1:
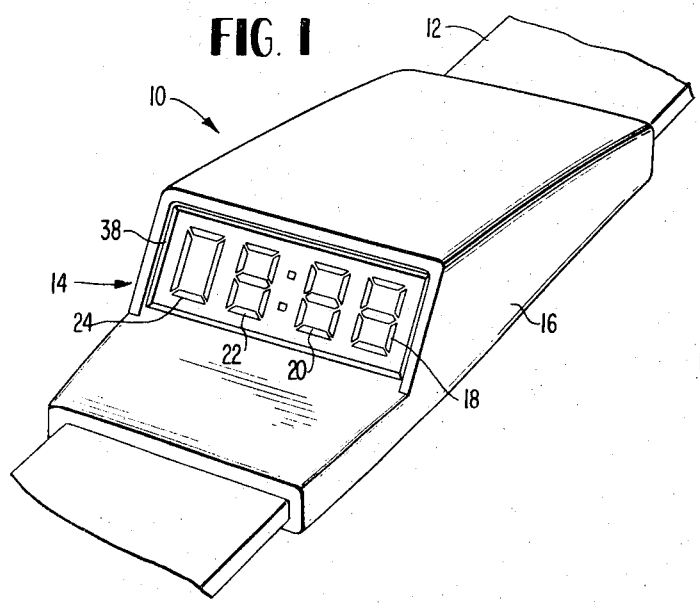
FIG. 1 is a perspective view of a self-illuminated liquid crystal watch having a digital time display viewable under all lighting conditions and constructed in accordance with the present invention.
Figure 4:
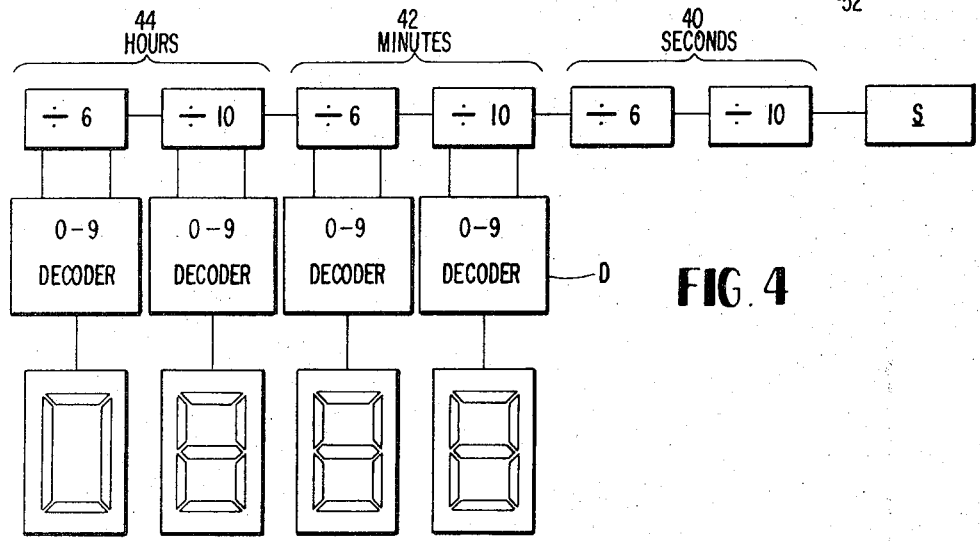
FIG. 4 is a diagram schematically illustrating the drive mechanism for the watch hereof.

Referring now to the drawings, particularly to FIG. 1, there is illustrated a watch, generally indicated at 10, having a watch band 12 and a time display face, generally indicated at 14. Watch 10 includes a casing 16 housing a timekeeping source, not shown, and circuitry for translating the timekeeping function of the source into digital form for display through face 14. Details of the timekeeping source and circuitry are schematically illustrated in FIG. 4 and are briefly described below, it being sufficient for present purposes to state briefly that four digital display stations 18, 20, 22 and 24 are exposed for display of selected time indicating digits through face 14. Two more stations similar to 18 can be employed if seconds are to be displayed. Face 14 inclines upwardly at an angle from housing 16 as to be readily viewable by the wearer of the watch when the wearer's arm is naturally raised to bring the watch casing into full view by the wearer.

In the preferred form, the digital display stations are arranged across the face 14 to display hours and minutes. For example, and as seen in FIG. 1, the right-hand display station 18 comprises a seven-bar-segment arranged to display minutes in selected units from zero to nine while the next adjacent station 20 includes a seven-bar-segment arranged to display selected tens of minutes from 0 to 5, whereby the full range of minutes from 0 to 59 can be displayed through the pair of seven-bar-segment stations 18 and 20. Display station 22 includes a seven-bar-segment array arranged to display the hours in selected units from 0 to 9, while the next adjacent station 24 comprises a four-bar-segment array arranged to display selected tens of hours in units from 0 to 1, whereby the hours from 0 to 11 can be displayed through the pair of bar-segments 22 and 24. It will be noted that the last segment 24 comprises a four-bar-segment as it is not necessary to provide a full seven-bar-segment where only the digits 0 and 1 are to be displayed. A full seven-bar-segment could, however, be employed in lieu of four-bar-segment, if desirable.

Figure 3:
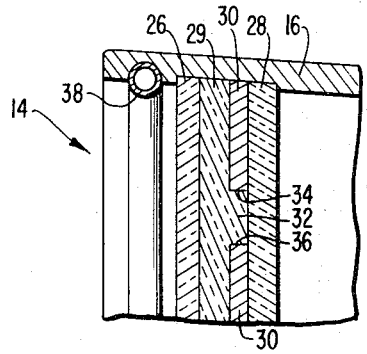
FIG. 3 is an enlarged fragmentary cross-sectional view of one of the bar-segments and the nuclear power source about the display face and is taken generally about on line 3—3 in FIG. 2.

Referring now to FIG. 3, one of the bar segments (the uppermost segment at station 18) is illustrated, and it will be appreciated that the remaining bar segments of that station and the bar segments of each of the other digital display stations are similarly constructed. Display face 14 comprises a front, substantially transparent plate 26, preferably formed of glass, and a rear plate 28 formed of a dark material, for example, a dark gray reflective glass. Plates 26 and 28 are spaced one from the other by suitable spacers, not shown, and a liquid crystal substance 29 described below, is disposed therebetween, preferably coextensively with plates 26 and 28. The front surface of rear glass 28 is coated with a transparent electrode material, indicated at 30, with portions of the surface remaining uncoated and defining a pair of electrodes across each of the bar-segments at each station 18, 20, 22 and 24. For example, coating 30 may be applied over the entire front surface of rear plate 28 with the electrode material subsequently being etched away to define a pair of electrodes for each segment of the seven-bar-segments 18, 20, and 22 and the four-bar-segment 24, as well as to electrically insulate the electrode pairs from one another. As illustrated in FIG. 3, the top bar-segment of the seven-bar segment 18 is shown at 32 with the edges of the electrode material as at 34 and 36 forming a pair of electrodes. Each of the bar-segments at each display station 18, 20, 22 and 24 is similarly formed as to provide electrodes across the etched portions of the electrode material. The electrode pairs may be suitable electrically insulated (as by etching) one from the other or, as will be apparent to those skilled in the art, the potential of selected individual electrodes of the various bar-segments can be identical, for example, at ground. For reasons as will presently become clear, a light source 38 is provided about display face 14 outwardly of front plate 26. Preferably, source 38 comprises a self-powered nuclear light source, for example, a Betalight ring. Ring 38 may comprise a generally rectangular sealed glass tube disposed about face 14, which tube is internally coated with a phosphor and filled with tritium gas. The radioactive tritium, on decay, emits electrons which are absorbed by the phosphor, causing it to emit light continuously in the visible spectrum. Lights of this type are well known and further description thereof is believed unnecessary.

Referring now to FIG. 4, there is shown a time source S which may comprise any suitable pulse generator such as a crystal oscillator and divider, the output of which is fed to series of dividers 40, 42, and 44. These dividers convert the output from source S into binary decimal signals which, in turn, are converted, by decoders D, into the energizing code for the bar-segment displays. The logic circuitry for converting the binary decimal signal into the bar-segment output for each digital display is well known and does not per se form any part of the present invention. Any suitable digital logic circuitry may be employed for this purpose. It is sufficient for present purposes to note that the pairs of electrodes defining the bar-segments can be selectively energized in a timed sequence to provide a digital time display.

As noted previously, a liquid crystal substance 29 is disposed between plates 26 and 28. The term liquid crystal, as herein employed, is applied to substances whose rheological behavior is similar to that of fluids but whose optical behavior is similar to the crystalline state over a given temperature range. Such substances exhibit mesomorphic behavior and, of the three states of mesomorphic behavior, the nematic state exhibits the electro-magnetic-optic effect utilized in the present digital time display. one type of nematic liquid crystal having the required electrical-magnetic-optical properties is p-azoxyanisole. This material exhibits the desired mesomorphic behavior within the required temperature range for a wristwatch. Characteristic of this liquid crystal under these conditions and with no electric or magnetic field applied, is its substantial transparency. However, when a field, either electric or magnetic, is applied, such liquid crystal becomes turbulent and scatters light, the effect of which is to reflect light which appears white. An additional characteristic of this liquid crystal is the fact that the greater the incident light on the energized liquid crystal, the greater the reflectivity, brightness and hence contrast with the surrounding environment.

Figure 2:
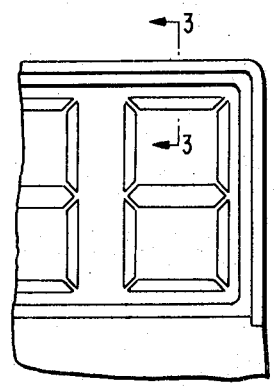
FIG. 2 is a fragmentary elevational view of the display face illustrating particularly a seven-bar-segment digit.

With reference now to FIGS. 1-3, it will be appreciated that, when the portions of the liquid crystal 29 disposed between the electrodes of the bar-segments remain in an unenergized state, the dark background of the rear plate 28 underlying such portions will be seen through the front transparent plate 26 and the transparent liquid crystal. Accordingly, in viewing the display face 14 under daylight conditions, the dark background afforded by rear plate 28 will be seen through the transparent electrode material 30 (essentially the entire display face 14) and through the portions of the liquid crystal lying between the electrodes of the unenergized bar-segments. However, the electrodes, which are energized through the logic circuitry illustrated in FIG. 4, energize the liquid crystals therebetween such that incident ambient light is scattered. This incident light, which is thus reflected, appears white against the dark surrounding background. Accordingly, the energized liquid crystal bar-segments provide a readily readable and clearly distinguishable time display in digital form, the digits being formed by the selectively energized liquid crystal bar-segments which appear white by scattering incident ambient light and hence contrast with the dark background of the rear plate 28. Moreover, the greater the incident or ambient light, the greater the contrast.

Under dark or semi-dark lighting conditions, the nuclear powered light source 38 about display face 14 provides the necessary light incident to the energized liquid crystal bar-segments whereby the latter appear white against the dark background similarly as under day lighting conditions. The Betalight ring about the display face provides sufficient light incident to the energized light crystal bar-segments such that this light can be reflected or scattered to provide clearly distinguishable bar-segments, and hence a clearly readable digital time display under dark or semidark conditions.

Figure 5:
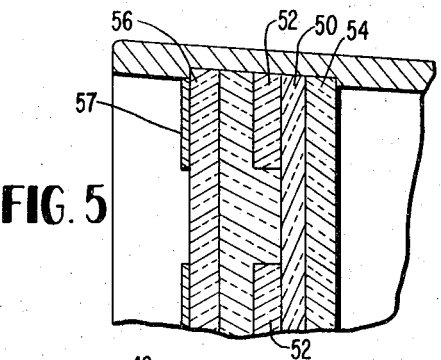
FIG. 5 is a fragmentary enlarged cross-sectional view of the display face similar to FIG. 3 and illustrating another form of the invention hereof with the nuclear powered light source disposed behind the display face.

In the form of the invention hereof illustrated in FIG. 5, there is illustrated a display face 14a having a rear clear transparent plate 50, preferably glass, on which is coated an electrode material 52, arranged similarly as in the previous form to provide pairs of electrodes defining individual bar-segments of each digital display. Behind the rear plate 50 is a light source, and may take the form of a self-contained, nuclear powered Betalight emitting plate 54. Plate 54 has a natural dark color under day lighting conditions which is utilized in this embodiment as described hereinafter. The front plate 56 is coated with a white opaque material 57 with the areas overlying the bar-segments left uncoated.

In this form, and under day lighting conditions, the energized bar-segments reflect or scatter light and appear white, rendering the same indistinguishable from the surrounding white opaque surface 57 of the outer plate 56. The unenergized liquid crystal bar-segments, however, remain transparent. The natural dark background color of the nuclear light source 54 accordingly appears through the clear back glass 50, the unenergized transparent liquid crystal bar-segments, and the associated clear bar-segments of the coated front glass 56 overlying the unenergized bar-segments to provide a dark contrast in digital form with the surrounding white surface of plate 56 and the white appearing energized segments in digital form. In this manner, the nonenergized portions of the liquid crystal bar-segments reflect or scatter the light incident thereupon from the nuclear powered light plate 54 and tis light is reflected back toward the plate 54 and does not appear through the display face 14a. The nonenergized liquid crystal bar-segments, however, being transparent in nature, permit the transmission of light from the light plate source 54 through the transparent rear plate 50, the transparent liquid crystal of the associated nonenergized bar-segments, and the uncoated segments of the plate front 56 overlying the nonenergized liquid crystal bar-segments as to be distinguishable against the background of the display face 14a. Thus, in daylight conditions, the natural color of the light plate source is seen through the transparent nonenergized liquid crystal bar-segments to define the digital display and under nighttime conditions the light emitted from the nuclear source is transmitted through the nonenergized liquid crystal bar-segments to define the digital display. Logic circuitry, complementary to the circuitry employed in the embodiment hereof illustrated in FIG. 3 can be employed as will be apparent to those skilled in the art.

Figure 6:
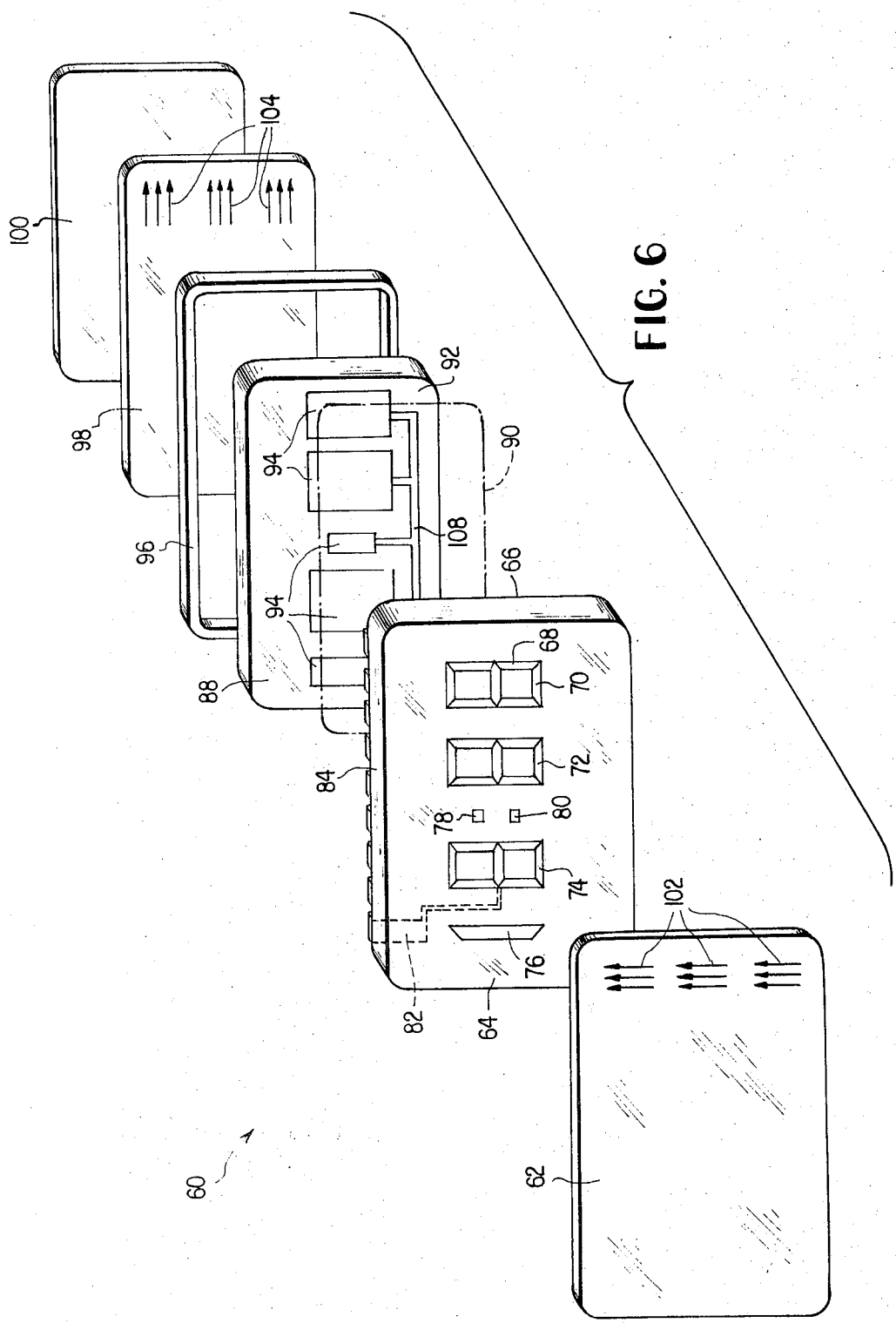
FIG. 6 is an exploded view of still another form of the present invention showing a digital time display construction utilizing a field effect liquid crystal.

FIG. 6 shows a modified digital time-display construction which utilizes a field effect liquid crystal material. As is well known the field effect or twisted nematic liquid crystals do not rely on dynamic scattering but instead involve alignment of the molecules of the field effect liquid crystal with the applied electric field. It is understood that the display illustrated in FIG. 6 in the present invention is incorporated in the watch of FIG. 1 and used in conjunction with a self-powered nuclear light source such as the ring 38 of FIG. 3 or the plate 57 of FIG. 5.

Referring to FIG. 6 the field effect liquid crystal display generally indicated at 60 comprises a front plate 62 which acts as a light polarizer. By way of example only front plate 62 may pass only vertically polarized light. Adjacent polarizer 62 is a glass plate 64 on the back surface 66 of which are mounted a plurality of transparent electrodes 68. These electrodes are formed for the most part as a seven-bar-segment array of spaced electrodes forming a minutes station 70, minutes tens station 72, hours station 74, hours tens station 76 and colon dots 78 and 80. Electrical connection from an external source is made to the display station electrodes and the colon dot electrodes by a plurality of transparent electrical conductors or leads 82. In the preferred embodiment there are 24 conductors 82 with 12 conductors evenly spaced on each of the two opposite sides 84 and 86 of the transparent glass plate 64.

Positioned between transparent glass plate 64 and a second similar transparent glass plate 88 is a thin film of field effect liquid crystal material having a substantially rectangular configuration as indicated by the dash line 90. On the front or near surface 92 of glass plate 88 are 5 large transparent electrodes 94 which form the common electrodes for the field effect liquid crystal 90. An annular epoxy sealing ring is illustrated at 96 and adjacent glass plate 88 is a second polarizer 98 which by way of example only may pass only horizontally polarized light. Finally, the rear of the digital display is made up of a light reflecting plate or mirror 100.

In operation vertically polarized portions of either ambient light or light from the nuclear light sources previously described passes through polarizer 62 as indicated by the vertical arrows 102 in FIG. 6. With the liquid crystal material 90 unenergized the polarized light is rotated or twisted by the field effect liquid crystal 90 so that much of it becomes horizontally polarized and passes through the second or rear polarizer 98 as indicated by the horizontal arrows 104. As a result, the light passes through the second polarizer and is reflected by mirror 100 so that all portions of the display have the same appearance, that is, all the liquid crystal material 90 appears transparent.

When an electrical potential is applied between selected segments of the display station and the common electrodes 94 the electric field created by this potential difference causes the molecules of the field effect liquid crystal 90 subjected to the electrical field to become aligned with the field. As a result, the vertically polarized light which passes through polarizer 62 is not twisted by the liquid crystal 90 when the crystal is energized so that the vertically polarized light passing through polarizer 62 cannot pass through the horizontal polarizer 98. The result is that light interrupted by the energized portions of the liquid crystal material does not pass through to and is not reflected by the mirror 100 so that those portions of the liquid crystal material appear dark in contrast with the remaining portions of the display. The dark portions of the display assume the configuration of the energized segments of the display stations so that the appropriate digital numerals appear dark in contrast with the remaining light or transparent portions of the display.

Figure 7:
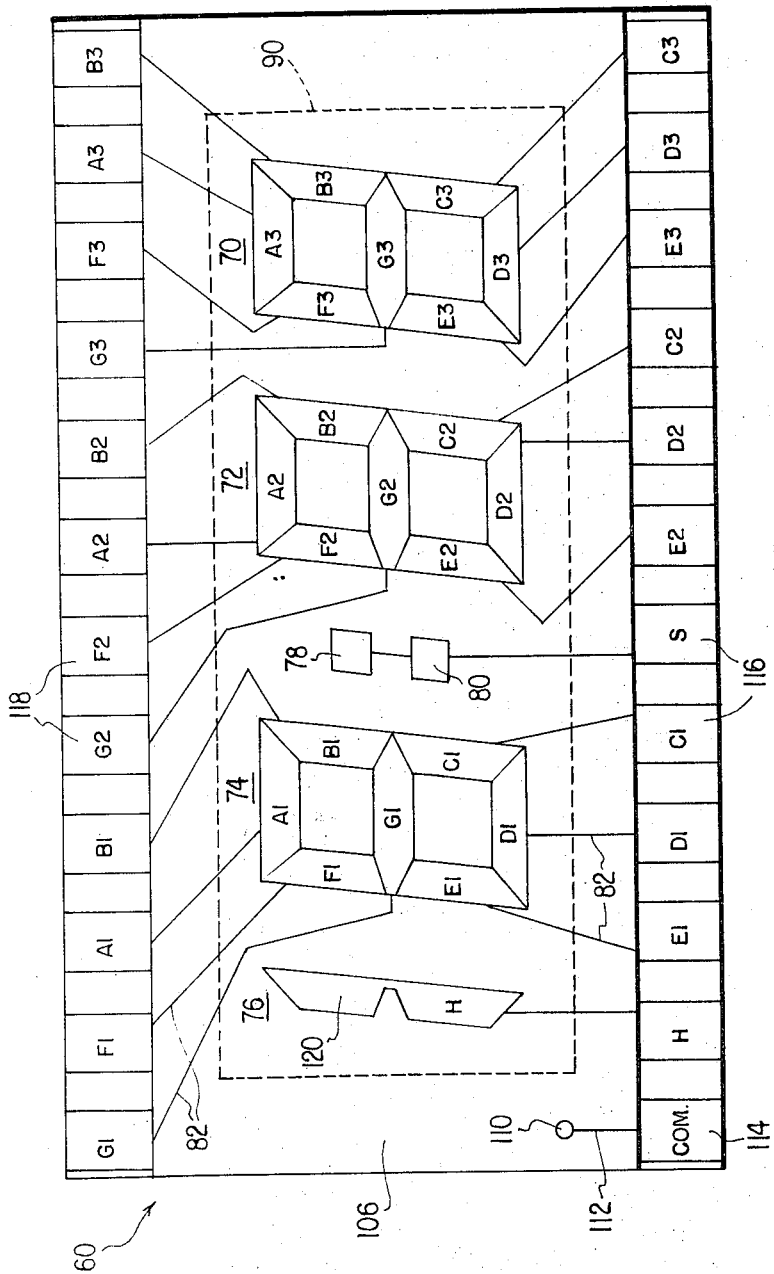
FIG. 7 is a front view of the time display of FIG. 6 showing the electrical connections to the transparent bar-segment electrodes.
Figure 8:
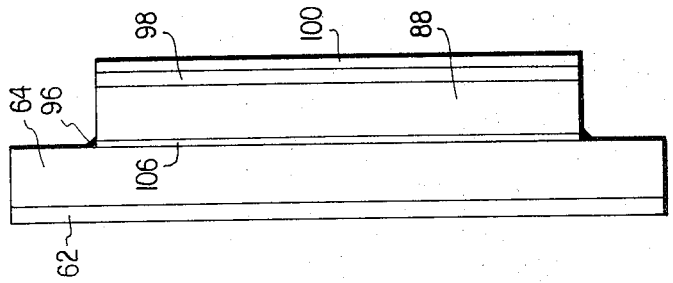
FIG. 8 is a side view of the display of FIG. 7.
Figure 9:
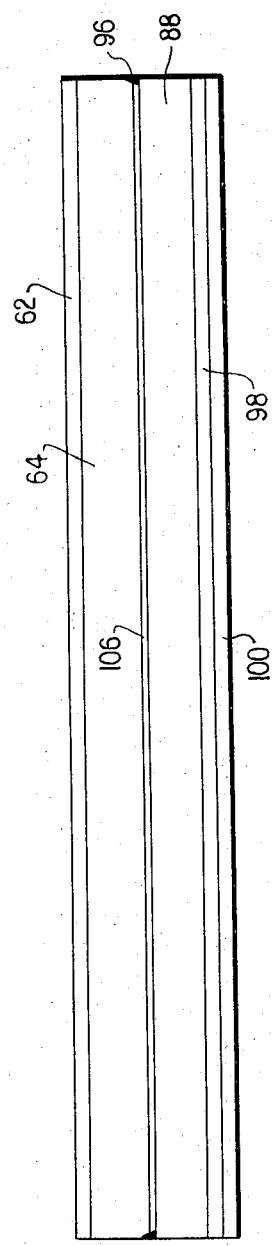
FIG. 9 is a bottom plan view of the display of FIG. 7.

FIG. 7 shows the assembled display and FIG. 8 is a side elevation and FIG. 9 shows a bottom plan view of the display 60 of FIG. 7. In FIG. 7 the liquid crystal material sandwiched between the glass plates 64 and 88 is indicated at 90 and the liquid crystal material is surrounded and retained by a thin rectangular gasket 106. Referring to FIG. 6 the common electrodes 94 on glass 88 are all connected to a common transparent lead 108. The gasket 106 in FIG. 7 is apertured to receive a conductive pin 110 which when the display is assembled establishes electrical connections between common lead 108 on glass plate 88 and a corresponding lead 112 on the back surface 66 of glass plate 64 which in turn connects to the common terminal 114. In addition to common terminal 114 11 other terminals 116 arranged along the bottom edge 86 of plate 64 on back surface 66 are connected to transparent leads 82 as are the 12 upper terminals 118. These terminals are all labelled in accordance with the particular segment of the display stations to which they are connected by the transparent leads 82. Each of the seven-bar-segments forming the stations 70, 72 and 74 are labelled A through F with the appropriate number 1, 2, or 3 corresponding to whether the segment forms part of station 74, station 72 or station 70. Individual segments at a station are slightly spaced so as to be electrically insulated from each other. The hours tens station is formed by a single electrode segment 120 since that station displays either a one or nothing at all, depending upon the tens of hours of time. Glass plate 88 as best seen in FIG. 8 is smaller in vertical dimension than front glass plate 64 so that the terminals 114, 116 and 118 on the back surface of front plate 64 are available for making external connection to the decoder which drives the display. As previously indicated an annular epoxy seal 96 is placed around gasket 106 at the juncture of glass plates 64 and 88 to tightly seal the liquid crystal material 70 between the glass plates and between the conductive transparent electrodes. The remaining elements of the assembly including the two polarizers and the mirror 100 are also preferably joined by a suitable epoxy adhesive to form a unitary structure as illustrated having the dimensions shown in the drawings.

The present invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A display for an electrical timepiece operable under variable external lighting conditions comprising means for displaying time information in digital form including a field effect liquid crystal, a source of electrical timing signals, means for applying said electrical timing signals to at least a portion of said material to provide an electric field for displaying timing information under one external lighting condition, and an auxiliary self-powered light source adjacent said liquid crystal and providing light incident to said liquid crystal for displaying timing information under a second external lighting condition, said liquid crystal being positioned between a pair of light polarizers.

2. A display according to claim 1 including a reflecting surface adjacent a side of one of said polarizers remote from said liquid crystal.

3. A display according to claim 2 wherein said reflecting surface comprises a mirror.

4. A display according to claim 1 wherein said polarizers pass differently polarized light.

5. A display according to claim 4 wherein one of said polarizers passes light polarized 90° with respect to the light passed by the other of said polarizers.

6. A wristwatch having a display veiwable under variable external lighting conditions comprising means for displaying time information in digital form including a pair of spaced transparent plates, a plurality of digital time display stations each including a plurality of transparent electrodes on one of said transparent plates, at least one common transparent electrode on the other of said plates, a polarizer carried by each of said plates, a mirror secured to one of said polarizers, a field effect liquid crystal between said plates, and an auxiliary self-powered light source adjacent said liquid crystal and providing light incident to said crystal for displaying timing information under a second external lighting condition.

7. A wristwatch according to claim 6 wherein said auxiliary light source comprises a nuclear source.

8. A wristwatch according to claim 6 including a divider for obtaining electrical timing signals, and means coupling said electrical timing signals to said plurality of transparent electrodes.

9. A wristwatch according to claim 8 wherein said coupling means comprises a decoder for transforming the output of said divider into drive signals for said plurality of transparent electrodes.

* * * * *

Disclaimer 3,841,083.—*John M. Bergey*, Lancaster, Pa. SELF-ILLUMINATED LIQUID CRYSTAL TIMEPIECE. Patent dated Oct. 15, 1974. Disclaimer filed Feb. 14, 1977, by the assignee, *Time Computer, Inc.*

The term of this patent subsequent to Mar. 27, 1990, has been disclaimed.

[*Official Gazette March 29, 1977.*]